(12) United States Patent
Riddering et al.

(10) Patent No.: US 6,459,547 B1
(45) Date of Patent: Oct. 1, 2002

(54) SLIDER WITH PADS AND TEXTURED LANDING ZONE FOR DISC STORAGE SYSTEM

(75) Inventors: Jason W. Riddering, Prior Lake; Zine-Eddine Boutaghou, Vadnais Heights, both of MN (US); Jing Gui, Fremont; Huan Tang, Cupertino, both of CA (US); Mukund C. Rao, Oklahoma City, OK (US); James E. Angelo, Falcon Heights, MN (US); Joshua C. Harrison, Stanford, CA (US); James M. Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/564,518

(22) Filed: May 4, 2000

Related U.S. Application Data

(63) Continuation of application No. 09/029,276, filed on Dec. 9, 1998
(60) Provisional application No. 60/151,105, filed on Aug. 27, 1999.

(51) Int. Cl.⁷ ............................................. G11B 21/21
(52) U.S. Cl. ............................. 360/236.6; 360/235.8; 360/135
(58) Field of Search ........................... 360/235.8, 236.6, 360/135

(56) References Cited

U.S. PATENT DOCUMENTS

| | | | |
|---|---|---|---|
| 3,754,104 A | 8/1973 | Piper et al. | 179/100.2 |
| 4,034,412 A | 7/1977 | Smith | 360/103 |
| 4,327,387 A | 4/1982 | Plotto | 360/103 |
| 4,692,832 A | 9/1987 | Bandara et al. | 360/137 |
| 4,757,402 A | 7/1988 | Mo | 360/103 |
| 4,853,810 A | 8/1989 | Pohl et al. | 360/103 |
| 4,893,204 A | 1/1990 | Yamada et al. | 360/103 |
| 4,901,185 A | 2/1990 | Kubo et al. | 360/104 |
| 5,010,429 A | 4/1991 | Taguchi et al. | 360/103 |
| 5,012,572 A | 5/1991 | Matsuzawa et al. | 29/603 |

(List continued on next page.)

FOREIGN PATENT DOCUMENTS

| | | |
|---|---|---|
| EP | 0 442 660 A2 | 8/1991 |
| JP | 54-23517 | 2/1979 |
| JP | 56-107363 | 8/1981 |
| JP | 58-66995 | 4/1983 |
| JP | 59-193580 | 11/1984 |
| JP | 4-245054 | 9/1992 |
| JP | 8-69674 | 3/1996 |
| JP | 08-069674 | 3/1996 |
| JP | 08-212740 | 8/1996 |
| JP | 8-279132 | 10/1996 |
| JP | 08-287440 | 11/1996 |

OTHER PUBLICATIONS

Technical Disclosure Bulletin, "Magnetic Disk Storage System With Structured Magnetic Head Slider", by IBM Corp., vol. 27, No. 10A, (Mar. 1985) pp. 5820–5821.

(List continued on next page.)

Primary Examiner—Jefferson Evans
(74) Attorney, Agent, or Firm—Westman, Champlin & Kelly, P.A.

(57) ABSTRACT

A disc storage system includes a rotating disc and a transducer. The transducer is carried on a slider which is supported by an armature. The armature is used to move the slider radially across the disc surface whereby information may be read from or written to the disc surface of the transducer. The slider includes an air bearing surface which faces the disc surface. As the disc rotates, the air bearing surface causes the slider to "fly" over the disc surface. Pads are provided on the air bearing surface to improve operational characteristics of the system and texturing is provided to a landing zone region on the disc surface.

17 Claims, 3 Drawing Sheets

U.S. PATENT DOCUMENTS

| | | | |
|---|---|---|---|
| 5,020,213 A | 6/1991 | Aronoff et al. ............... 29/603 |
| 5,034,828 A | 7/1991 | Ananth et al. ................ 360/75 |
| 5,052,099 A | 10/1991 | Taguchi et al. ............... 29/603 |
| 5,063,712 A | 11/1991 | Hamilton et al. .............. 51/67 |
| 5,067,037 A | 11/1991 | Ananth et al. .............. 360/103 |
| 5,079,657 A | 1/1992 | Aronoff et al. ............. 360/103 |
| 5,162,073 A | 11/1992 | Aronoff et al. ............. 156/625 |
| 5,200,867 A | 4/1993 | Albrecht et al. ............ 360/103 |
| 5,202,803 A | 4/1993 | Albrecht et al. ......... 360/97.02 |
| 5,267,104 A | 11/1993 | Albrecht et al. ......... 360/97.02 |
| 5,278,711 A | 1/1994 | Gregory et al. ............ 360/103 |
| 5,282,337 A | 2/1994 | Best et al. ............... 360/97.02 |
| 5,323,282 A | 6/1994 | Kanai et al. ................ 360/103 |
| 5,345,353 A | 9/1994 | Krantz et al. .............. 360/103 |
| 5,374,463 A | 12/1994 | Bethune et al. ............. 428/64 |
| 5,386,666 A | 2/1995 | Cole .............................. 451/5 |
| 5,388,020 A | 2/1995 | Nakamura et al. .......... 360/135 |
| 5,396,386 A | 3/1995 | Bolasna et al. ............. 360/103 |
| 5,396,387 A | 3/1995 | Murray ....................... 360/103 |
| 5,418,667 A | 5/1995 | Best et al. .................. 360/103 |
| 5,420,735 A | 5/1995 | Haines ....................... 360/103 |
| 5,424,888 A | 6/1995 | Hendriks et al. ........... 360/103 |
| 5,490,027 A | 2/1996 | Hamilton et al. ........... 360/104 |
| 5,499,149 A | 3/1996 | Dovek ........................ 360/103 |
| 5,508,861 A | 4/1996 | Ananth et al. .............. 360/103 |
| 5,515,219 A | 5/1996 | Ihrke et al. ................. 360/103 |
| 5,526,204 A | 6/1996 | French et al. ............ 360/97.02 |
| 5,537,273 A | 7/1996 | Hendriks et al. ........... 360/103 |
| 5,550,691 A | 8/1996 | Hamiton ..................... 360/103 |
| 5,550,693 A | 8/1996 | Hendriks et al. ........... 360/103 |
| 5,550,696 A | 8/1996 | Nguyen ....................... 360/135 |
| 5,557,488 A | 9/1996 | Hamilton et al. ........... 360/104 |
| 5,569,506 A | 10/1996 | Jahnes et al. .............. 428/65.3 |
| 5,572,386 A | 11/1996 | Ananth et al. .............. 360/103 |
| 5,606,476 A | 2/1997 | Chang et al. ............... 360/103 |
| 5,612,838 A | 3/1997 | Smith et al. ................ 360/102 |
| 5,625,512 A | 4/1997 | Smith ......................... 360/103 |
| 5,626,941 A | 5/1997 | Ouano ........................ 428/141 |
| 5,673,156 A | 9/1997 | Chen et al. .............. 360/97.01 |
| 5,768,055 A | 6/1998 | Tian et al. .................. 360/103 |
| 5,774,303 A | 6/1998 | Teng et al. ................. 360/103 |
| 5,808,380 A | 9/1998 | Ishihara et al. ............... 360/13 |
| 5,815,346 A | 9/1998 | Kimmal et al. ............. 360/103 |
| 5,841,608 A | 11/1998 | Kasamatsu et al. ......... 360/103 |
| 5,864,452 A | 1/1999 | Hirano et al. ............... 360/122 |
| 5,870,250 A | 2/1999 | Bolasna et al. ............. 360/103 |
| 5,870,251 A | 2/1999 | Boutaghou .................. 360/103 |
| 5,872,686 A | 2/1999 | Dorius et al. ............... 360/103 |
| 5,886,856 A | 3/1999 | Tokuyama et al. .......... 360/103 |
| 5,949,612 A | 9/1999 | Gudenman et al. ...... 360/97.01 |
| 5,991,118 A | 11/1999 | Kasamatsu et al. ......... 360/103 |
| 5,994,035 A | 11/1999 | Tsukamoto et al. ......... 430/320 |
| 6,040,958 A | 3/2000 | Yamamoto et al. ......... 360/103 |

OTHER PUBLICATIONS

"Stiction Free Slider for the Smooth Surface Disk", by Y. Kasamatsu et al., *IEEE Transactions on Magnetics,* vol. 31, No. 6, (Nov. 1995), pp. 2961–1963.

"A Stiction Model for a Head–Disk Interface of a Rigid Disk Drive", by J. Gui et al., *J. Appl. Phys.,* vol. 8, No. 6, (Sep. 15, 1995), pp. 4206–4217.

"A Model for Mechanical Seals with Regular Microsurface Structure", by I. Etsion et al., *Tribology Transactions,* vol. 39, (1996), pp. 677–683.

"Increasing Mechanical Seals Life With Laser–Textured Seal Faces", by G. Halperin et al., *Surface Surtech Technologies Ltd.,* (Sep. 1997), pp. 1–12.

SLIDER WITH PADS AND TEXTURED LANDING ZONE FOR DISC STORAGE SYSTEM

The present invention claims priority to Provisional Application Serial No. 60/151,105, filed Aug. 27, 1999; and application Ser. No. 09/029,276, filed Dec. 9, 1998.

BACKGROUND OF THE INVENTION

The present invention relates to disc storage systems for storing information. More specifically, the present invention relates to sliders used in such systems.

Disc drives are used for storing information, typically as magnetically encoded data, and more recently as optically encoded data, on a disc surface. A transducing head is carried on a air-bearing slider that rides on a bearing of air above the disc surface as the disc rotates at high speed. In another technique, the slider contacts the disc surface with no air bearing interface such as is shown in U.S. Pat. Nos. 5,453,315 and 5,490,027. The head is then positioned radially over the disc to read back or write at a desired location. Benefits associated with an air bearing design are lost in such "contact" sliders.

In an air bearing design, the air bearing provides an interface between the slider and the disc which prevents damage to the disc over the life of the system, provides damping if the disc drive system undergoes shock due to external vibrations. The air bearing is also used to provide a desired spacing between the transducing element and the disc surface. A bias force is applied to the slider by a flexure armature in a direction toward the disc surface. This bias force is counteracted by lifting forces from the air bearing until an equilibrium is reached. The slider will contact the disc surface if the rotating speed of the disc is insufficient to cause the slider to "fly." This contact typically occurs during start up or shut down of the disc. If the slider contacts a region of the disc which carries data, the data may be lost and the disc permanently damaged.

In many disc drive systems, a lubricant is applied to the disc surface to reduce damage to the head and the disc surface during starting and stopping. Air or gas also acts as a lubricant. However, a phenomenon known as "stiction," which is caused by static friction and viscous shear forces, causes the slider to stick to the disc surface after periods of non use. The lubricant exacerbates the stiction problem. The stiction can damage the head or the disc when the slider is freed from the disc surface. Additionally, the spindle motor used to rotate the disc must provide sufficient torque to overcome the stiction.

One technique used to overcome the problem associated with stiction is to provide texturing to at least a portion of the disc surface. As the fly height of disc drive system has been continually reduced to produce smaller and smaller transducer spacing, mechanical interference is increased. This is especially true in discs which use a textured landing zone such as that provided by laser texture bumps. Such laser texturing is provided to reduce the high levels of stiction that are generated by the smooth surfaces of the head and disc when they contact. However, using present laser texturing technology, the required height of the bumps in the landing zone textured region require to mitigate the stiction is greater than the nominal flying height of the head. This causes excessive wear and interference in the landing zone region. However, if the texturing in the landing zone is reduced, the stiction quickly increases to unacceptable levels.

SUMMARY OF THE INVENTION

A disc storage system includes a rotating disc and a transducer. The transducer is carried on a slider which is supported by an armature. The armature is used to move the slider radially across the disc surface whereby information may be read from or written to the disc surface of the transducer. The disc surface includes a landing zone region which is textured, for example, through laser texturing techniques. The slider includes an air bearing surface which faces the disc surface. As the disc rotates, the air bearing surface causes the slider to "fly" over the disc surface. Pads are provided on the air bearing surface and cooperate with bumps or other texturing in the landing zone region to reduce stiction without damaging the slider.

DETAILED DESCRIPTION OF THE PREFERRED EMBODIMENTS

Figure 1:
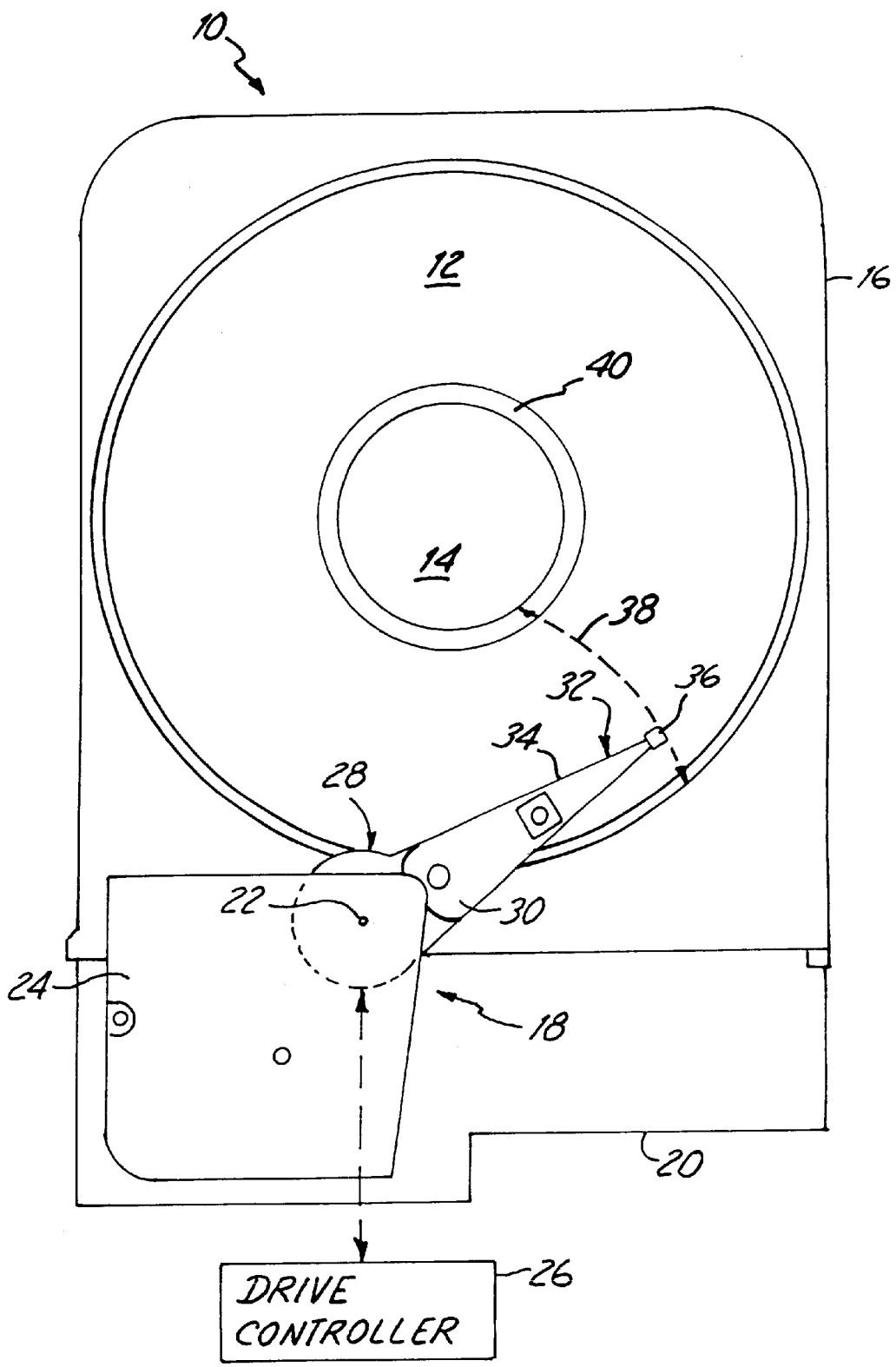
FIG. 1 is a simplified diagram of a storage disc system in accordance with the present invention.

FIG. 1 is a top view of a disc drive 10 including a slider in accordance with the present invention. Disc drive 10 includes a magnetic disc 12 mounted for rotational movement about and axis defined by spindle 14 within housing 16. Disc drive 10 also includes an actuator 18 mounted to a base plate 20 of housing 16 and pivotally moveable relative to disc 14 about axis 22. A cover 24 covers a portion of actuator 18. Drive controller 26 is coupled to actuator 18. In the preferred embodiment, drive controller 26 is either mountable within disc drive 10, or is located outside of disc drive 10 with suitable connection to actuator 18. Actuator 18, includes an actuator arm assembly 28, a rigid support member 30, and a head gimbal assembly 32. Head gimbal assembly 32 includes a load beam or flexure arm 34 coupled to rigid member 30, and a slider 36 coupled by a gimbal (not shown) to load beam 34. Slider 36 operates in accordance with the embodiments set forth herein and supports a transducer for reading information from and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position signal to actuator 18. The position signal causes actuator 18 to pivot about axis 22. This, in turn, causes actuator 18 to pivot about axis 22. This, in turn, causes slider 36 (and consequently the transducer mounted on slider 36) to move radially over the surface of disc 12 in a generally arcuaic path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Recording density can be increased by reducing the fly height of slider 36. Close proximity of slider 36 with disc 12 allows greater accuracy in reading and writing information onto disc 12.

Stiction and fly/stiction are two major phenomena that impair the use of ultra-low flying recording heads to increase recording areal density. The solution to these problems has been to generate, in a controlled fashion, some asperities, or texture, on the media surface to reduce the area of contact at the head-media interface. The presence of these asperities on the media surface, although they can be confined to within a small dedicated zone 40 (i.e., a "landing zone"), enhances the chance of head-media contact during operation and thereby sets the limit to the true attainment of ultra-low flying. Using current laser texturing technology, the height of the bumps in the landing zone required to mitigate stiction is surpassing the nominal flying height of the head. This causes interference between the slider surface and the textured landing zone. This interference can result in increased head and media wear which will eventually lead to interface failure. If the size of the bumps in the textured region is reduced, the stiction quickly increases to unacceptable levels, ranging from 10 grams to as high as 50 grams or more, depending upon the amount of height reduction.

The present invention utilizes pads on the slider surface in conjunction with texturing of the landing zone region. With the present invention, the spacing required to mitigate stiction is shared between the slider and the disc. Examples of slider and pad configurations are described in U.S. patent application Ser. No. 09/029,276, filed Dec. 9, 1998 and entitled "SLIDER FOR DISC STORAGE SYSTEM" which is assigned to the present assignee and is incorporated herein by reference in its entirety.

Figure 2:
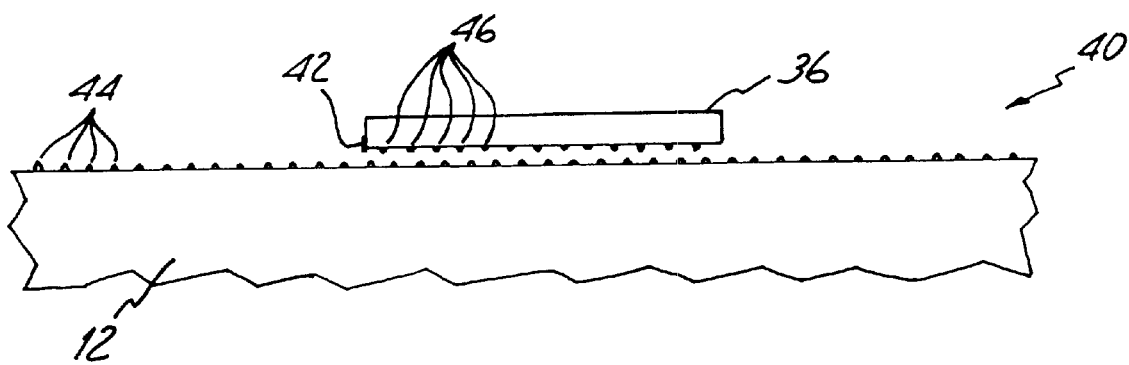
FIG. 2 is a side view showing a slider interacting with a landing zone of the disc of FIG. 1 in accordance with the present invention.

FIG. 2 is a side cross-sectional view of a portion of disc 12, approximate landing zone 40 showing a relationship between slider 36 which carries head 42 and landing zone 40. Landing zone 40 is textured using any appropriate texturing technique such as laser texturing to thereby form bumps, protrusions, reliefs or other asperities 44. Asperities 44 can have any desired shape, configuration, size or density and can be formed as protrusions from disc 12 or as reliefs into disc 12. Slider 36 includes a plurality of pads 46. Asperities 44 and pads 46 function in conjunction to reduce stiction between slider 36 and landing zone 40. This configuration allows the slider 36 to fly at a lower level because some of the spacing used to reduce stiction is shared with asperities 44. The lower fly height improves recording performance and allows for increased storage density. Pads 46 can be, for example, made of diamond-like carbon (DLC) which has excellent tribological properties. However, other materials can also be used such as silicon carbon (SiC).

The pads 46 also permit a higher level of interference between the slider 36 and the disc 12 because they are made of diamond-like carbon which has excellent wear properties. This wear occurs on pads 46 instead of on the slider 36 or on disc 12. If the height and placement of pads 46 is chosen appropriately, the wear will reach a steady state and stiction will remain at very low levels over the entire life of the interface. The addition of diamond-like carbon pads to the slider 36 allows a reduction in the height of asperities 44 while still providing good stiction and wear performance. Because a higher level of interference is tolerable when pads 46 are made from diamond-like carbon, it is desirable to provide reduced laser texturing in landing zone 40 rather than no laser texturing, because of the added margin against stiction and the significantly reduced susceptibility to disc curvature variation.

Figure 3:
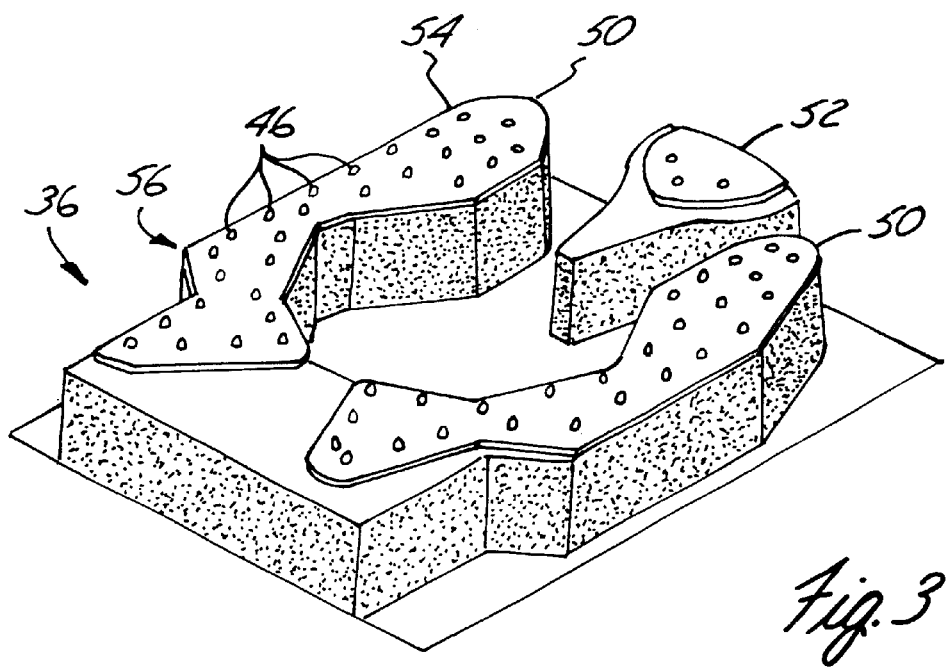
FIG. 3 is a bottom plan view of one embodiment of a slider including pads.

FIG. 3 is a bottom plan view of a slider 36 in accordance with one embodiment of the present invention. Slider 36 includes rails 50 and center island 52 each carrying pads 36 thereon. In the embodiment of FIG. 3 pads 46 near the trailing edge 54 of slider 36 have a reduced height in comparison to the other pads. Pads 46 can be formed of diamond-like carbon. The configuration shown in FIG. 3 provides good protection against contact between the air bearing surface 56 of slider 36 and asperities 44 of landing zone 40 shown in FIG. 2. The reduced heights of the pads 46 near the trailing edge 54 provides more complete coverage of the entire air bearing surface 56 with pad heights which will not interfere with performance of the head. The optimum height for pads 46 over the majority of the air bearing surface 56 may be too high to allow the pads 46 to be placed on the center island 52 and the trailing portions of rails 50 because they could contact the surface of disc 12 and cause increased spacing between the transducing head and the disc surface. It is very important to account for the distribution of the air bearing performance across multiple sliders when placing pads 46 to ensure that the entire population of sliders 36 will not experience increased transducer spacing due to pad contact. For the design of FIG. 3, the head to disc separation can be analyzed over the entire air bearing surface for optimum placement of pads 46.

Figure 4:
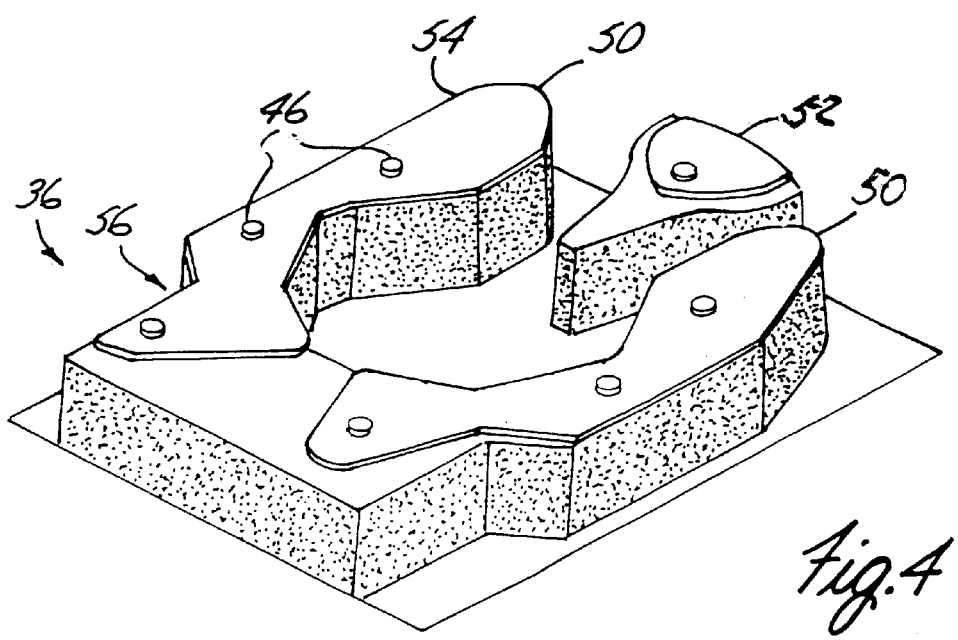
FIG. 4 is a bottom plan view of another embodiment of the slider including pads.

FIG. 4 is a perspective view of sliders 36 in accordance with another embodiment. In the embodiment of FIG. 4, fewer pads 46 are provided, however they provide a larger area than the pads shown in FIG. 3. Of course, there are many variations of pad shapes, sizes, locations and distributions that can be used in accordance with the present invention. Further, all of the pads can have the same height across the entire air bearing surface.

The present invention provides a technique which provides pads on the slider and asperities in the landing zone of the disc to provide the benefits of both configurations. The addition of the diamond-like carbon pads on the air bearing surface of the head allows a reduction in the height of the texturing in the landing zone while still maintaining good stiction performance. Further, the height of the pads on the slider can be reduced to thereby lower fly height, improve performance and increase recording density. The pads can be designed to wear until a steady state is reached. Further, wear will not occur on the slider or on the disc. The present invention allows an increased level of interference between the head and the disc because the contact occurs on diamond-like carbon pads. In one preferred embodiment, the laser texturing on the disc surface is designed to have a glide avalanche equal or below the fly height. The height of the pads located on the head are designed to normally clear the disc in the data zone (untextured region). With the above mentioned goals and knowing the performance of the air bearing, a laser bump height is selected, and the pad height and location are derived. For example, fly height=0.5 $\mu$:inches media texturing=0.5 $\mu$:inches pad height=300 Å and the location of bumps are 10–12 mils from trailing edge. In one embodiment, the laser texturing on the disc surface is 60–90 Å in height, 4–6 $\mu$m in diameter, with spacing from 11×11 to 16×16 $\mu$m and the pads on the slider surface are about 20 $\mu$m in diameter, 250–300 Å in height, with the trailing row positioned based on flying clearance, spaced 60 to 80 $\mu$m center to center, with 40 to 60 total pads (FIG. 3). The trailing rows of pads on the slider may be at a lower height than the leading pads (100 to 200 Å) based on flying clearance. Other variations of pad diameter and count may also be employed (FIG. 4). In another embodiment, laser texturing height is 40–100 Å and diameter is 3–8 $\mu$m with spacing from 11×11 to 25×25 $\mu$m. A texturing on the disc has a density of 8500 1/mm$^2$ to 1600 1/mm$^2$. This can be formed by laser texturing the surface.

Although the present invention has been described with reference to preferred embodiments, workers skilled in the art will recognize that changes may be made in form and detail without departing from the spirit and scope of the invention. In general, the pads may be placed along any protruding portion of the air bearing surface such as the side rails, a center rail, a center island, etc. In general, the present invention includes any size, shape, height, placing, configuration, density, etc. of the pads or texturing set forth herein. The texturing or the pads can be made in accordance with process as desired. The invention may be used with any type of transducing element including inductive, magnetoresistive, optical elements or others.

What is claimed is:

1. A disc drive storage system, comprising:
    a rotating disc having a disc surface;
    a transducing head configured to read and write on the disc surface;
    transducing circuitry coupled to the transducing head;
    a slider having rails formed thereon and having an air bearing surface, the slider supporting the transducing head proximate the disc surface;
    a plurality of pads carried on the rails having an area which contact the disc surface during contact start/stop (CSS) and a height selected to provide a desired maximum stiction during CSS; and
    a landing zone region on the disc surface having texturing formed thereon;
    wherein the slider has a leading edge and a trailing edge and pads proximate the trailing edge have a height which is less than pads proximate the leading edge such that fly height of the trailing edge is reduced, the pads and texturing have respective heights to reduce stiction in the landing zone and the texturing having a height to cooperate with the pad height to allow reduced fly height of the slider.

2. The disc storage system of claim 1 wherein the pads comprise diamond-like carbon.

3. The disc storage system of claim 1 wherein the slider includes a center island.

4. The disc storage system of claim 3 including pads on the center island.

5. The disc storage system of claim 1 wherein the pads wear to reach an equilibrium with the texturing.

6. The disc storage system of claim 1 wherein the texturing comprises laser texturing.

7. The disc storage system of claim 1 wherein the pads comprise carbon.

8. The disc storage system of claim 1 wherein the pads have a height of between 250 Å and 300 Å and the texturing in the landing zone region is between 40 Å and 100 Å.

9. The disc storage system of claim 1 wherein the pads have a diameter of 20 $\mu$m and the texturing has a spacing of 11×11 $\mu$m to 16×16$\mu$m.

10. The disc storage system of claim 1 wherein the texturing has a diameter of 4 $\mu$m to 6 $\mu$m and the pads have a spacing of 60 $\mu$m to 80 $\mu$m center-to-center.

11. A method reducing stiction in a disc storage system, comprising:
    texturing a landing zone region on a surface of a disc of the storage system;
    forming pads on rails of a slider; wherein the pads and texturing cooperate to reduce stiction in the landing zone region, the texturing further configured to cooperate with the pads to allow reduced height of the pads and reduced fly height the pads having a height to provide a desired maximum stiction during CSS; and
    forming pads proximate a trailing edge of the slider with a height which is less than a height of pads proximate a leading edge.

12. The method of claim 11 wherein texturing comprises laser texturing.

13. The method of claim 11 wherein the pads comprise diamond-like carbon.

14. The method of claim 11 wherein the pads comprise SiC.

15. A disc storage system made in accordance with claim 11.

16. A disc drive storage system, comprising:
    a rotating disc having a disc surface;
    a transducing head configured to read and write on the disc surface;
    transducing circuitry coupled to the transducing head;
    a slider having rails formed thereon and having an air bearing surface, the slider supporting the transducing head proximate the disc surface;
    a plurality of pads carried on the rails having an area which contact the disc surface during contact start/stop (CSS) and a height selected to provide a desired maximum stiction during CSS; and
    a landing zone region on the disc surface having texturing formed thereon, wherein the texturing has a spacing of 11×11 $\mu$m to 25×25 $\mu$m.

17. A disc drive storage system, comprising:
    a rotating disc having a disc surface;
    a transducing head configured to read and write on the disc surface;
    transducing circuitry coupled to the transducing head;
    a slider having rails formed thereon and having an air bearing surface, the slider supporting the transducing head proximate the disc surface;
    a plurality of pads carried on the rails having an area which contact the disc surface during contact start/stop (CSS) and a height selected to provide a desired maximum stiction during CSS; and
    a landing zone region on the disc surface having texturing formed thereon, wherein the texturing has a diameter of 4 $\mu$m to 6 $\mu$m and the pads have a spacing of 60 $\mu$m to 80 $\mu$m center-to-center.

* * * * *

UNITED STATES PATENT AND TRADEMARK OFFICE
CERTIFICATE OF CORRECTION

PATENT NO.    : 6,459,547 B1
DATED         : October 1, 2002
INVENTOR(S)   : Jason W. Riddering et al.

It is certified that error appears in the above-identified patent and that said Letters Patent is hereby corrected as shown below:

<u>Title page,</u>
Item [75], Inventors, change "James E. Angelo, Falcon Heights, MN" to
-- James E. Angelo, Burnsville, MN --.
Item [56], References Cited, U.S. PATENT DOCUMENTS, replace
"5,282,337" with -- 5,285,337 --; and replace "5,808,380 A" with -- 5,805,380 A --.

Signed and Sealed this

Twenty-seventh Day of May, 2003

JAMES E. ROGAN
*Director of the United States Patent and Trademark Office*